US009490898B2

(12) United States Patent
Mukai et al.

(10) Patent No.: US 9,490,898 B2
(45) Date of Patent: Nov. 8, 2016

(54) COMMUNICATION SYSTEM, MASTER STATION DEVICE, SLAVE STATION DEVICE, CONTROL UNIT, AND COMMUNICATION CONTROL METHOD

(71) Applicants: Hiroaki Mukai, Chiyoda-ku (JP); Koshi Sugimura, Chiyoda-ku (JP)

(72) Inventors: Hiroaki Mukai, Chiyoda-ku (JP); Koshi Sugimura, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 28 days.

(21) Appl. No.: 14/377,356

(22) PCT Filed: Jan. 15, 2013

(86) PCT No.: PCT/JP2013/000120
§ 371 (c)(1),
(2) Date: Aug. 7, 2014

(87) PCT Pub. No.: WO2013/157171
PCT Pub. Date: Oct. 24, 2013

(65) Prior Publication Data
US 2015/0023664 A1 Jan. 22, 2015

(30) Foreign Application Priority Data
Apr. 20, 2012 (JP) .................................. 2012-096408

(51) Int. Cl.
*H04J 14/02* (2006.01)
*H04B 10/27* (2013.01)
(Continued)

(52) U.S. Cl.
CPC ............ *H04B 10/27* (2013.01); *H04B 10/272* (2013.01); *H04J 14/025* (2013.01);
(Continued)

(58) Field of Classification Search
CPC ............... H04J 14/0267; H04J 14/025; H04J 14/0282; H04J 14/0246; H04J 14/0242; H04J 14/0258; H04B 10/27; H04B 10/272; H04B 14/0257; H04L 12/403; H04L 12/12; Y02B 60/34
See application file for complete search history.

(56) References Cited

U.S. PATENT DOCUMENTS

2006/0115271 A1  6/2006 Hwang et al.
2007/0154217 A1* 7/2007 Kim ........................ H04J 14/02
                                                    398/72
(Continued)

FOREIGN PATENT DOCUMENTS

JP   2006 157847    6/2006
JP   2006 197489    7/2006
(Continued)

OTHER PUBLICATIONS

"Draft document of G.multi", Huawei Technologies, COM 2-C 1849-E, Total 15 Pages, (Nov. 2011).
(Continued)

*Primary Examiner* — Leslie Pascal
(74) *Attorney, Agent, or Firm* — Oblon, McClelland, Maier & Neustadt, L.L.P.

(57) ABSTRACT

A communication system in which a master station device is connected to a plurality of slave station devices by an optical transmission line and a plurality of wavelengths are used to perform at least one of downstream communication and upstream communication. The master station device includes: a control unit that assigns a wavelength to be used in communication to the slave station device, and that generates a control signal for notifying the slave station device of the assigned wavelength; and an optical transmitter that transmits the control signal generated by the control unit to the slave station device. The slave station device includes an optical receiver and an optical transmitter that carry out communication with the master station device using the wavelength based on the control signal received from the master station device.

17 Claims, 6 Drawing Sheets

(51) Int. Cl.
    *H04B 10/272* (2013.01)
    *H04L 12/12* (2006.01)
    *H04L 12/403* (2006.01)

(52) U.S. Cl.
    CPC ...... *H04J 14/0242* (2013.01); *H04J 14/0246* (2013.01); *H04J 14/0257* (2013.01); *H04J 14/0267* (2013.01); *H04J 14/0282* (2013.01); *H04L 12/12* (2013.01); *H04L 12/403* (2013.01); *H04J 14/0258* (2013.01); *Y02B 60/34* (2013.01)

(56) References Cited

U.S. PATENT DOCUMENTS

| | | | | |
|---|---|---|---|---|
| 2009/0110400 | A1* | 4/2009 | Nozue | H04J 14/0282 398/71 |
| 2010/0158527 | A1* | 6/2010 | Mizutani | H04B 1/707 398/78 |
| 2011/0085795 | A1* | 4/2011 | Ozaki | H04J 14/0282 398/25 |
| 2012/0106958 | A1* | 5/2012 | Sakamoto | H04J 14/0282 398/58 |
| 2015/0207585 | A1* | 7/2015 | Luo | H04J 14/023 398/72 |

FOREIGN PATENT DOCUMENTS

| | | |
|---|---|---|
| JP | 2007 43270 | 2/2007 |
| JP | 2007 174364 | 7/2007 |
| JP | 2007 195227 | 8/2007 |
| JP | 2007 274627 | 10/2007 |
| JP | 2007 324885 | 12/2007 |
| JP | 2008 92194 | 4/2008 |
| JP | 2008 172351 | 7/2008 |
| JP | 2009 182997 | 8/2009 |
| JP | 2011 82908 | 4/2011 |
| JP | 2011 228800 | 11/2011 |
| JP | 2014-515221 | 6/2014 |
| WO | WO 2012/136155 A1 | 10/2012 |

OTHER PUBLICATIONS

International Search Report Issued Feb. 26, 2013 in PCT/JP13/000120 Filed Jan. 15, 2013.
Extended European Search Report issued Dec. 1, 2015 in Patent Application 13777747.0.
Michael P. McGarry, et al., "An Evolutionary WDM Upgrade for EPONs" http://mre.faculty.asu.edu/EPONupgrade.pdf, XP055115813, Jan. 1, 2005, pp. 1-24.
Michael P. McGarry, et al., "WDM Ethernet Passive Optical Networks" IEEE Optical Communications, vol. 44, XP1240359, Feb. 2006, pp. S18-S25.
Office Action issued Sep. 15, 2015 in Japanese Patent Application No. 2014-230795 (with English translation).

* cited by examiner

Fig. 3

| ONU ID 1 | USABLE WAVELENGTH (DOWNSTREAM) $\lambda 11 \sim \lambda 14$ | USABLE WAVELENGTH (UPSTREAM) $\lambda 21 \sim \lambda 24$ | SWITCHING TIME t1 |
|---|---|---|---|

Fig. 4

| ONU ID | USABLE WAVELENGTH | | OPERATING WAVELENGTH | | SWITCHING TIME |
|---|---|---|---|---|---|
| | Rx (DOWNSTREAM) | Tx (UPSTREAM) | Rx (DOWNSTREAM) | Tx (UPSTREAM) | |
| 1 | $\lambda 11 \sim \lambda 14$ | $\lambda 21 \sim \lambda 24$ | $\lambda 11$ | $\lambda 21$ | t1 |
| 2 | $\lambda 11$ | $\lambda 21$ | $\lambda 11$ | $\lambda 21$ | t2 |
| 3 | $\lambda 11, \lambda 12$ | $\lambda 21, \lambda 22$ | $\lambda 12$ | $\lambda 22$ | t3 |
| ⋮ | ⋮ | ⋮ | ⋮ | ⋮ | ⋮ |
| N | $\lambda 11 \sim \lambda 14$ | $\lambda 21 \sim \lambda 24$ | $\lambda 13$ | $\lambda 23$ | tn |

Fig. 5

| ONU ID 1 | OPERATING WAVELENGTH (DOWNSTREAM) $\lambda 12$ | OPERATING WAVELENGTH (UPSTREAM) $\lambda 22$ |
|---|---|---|

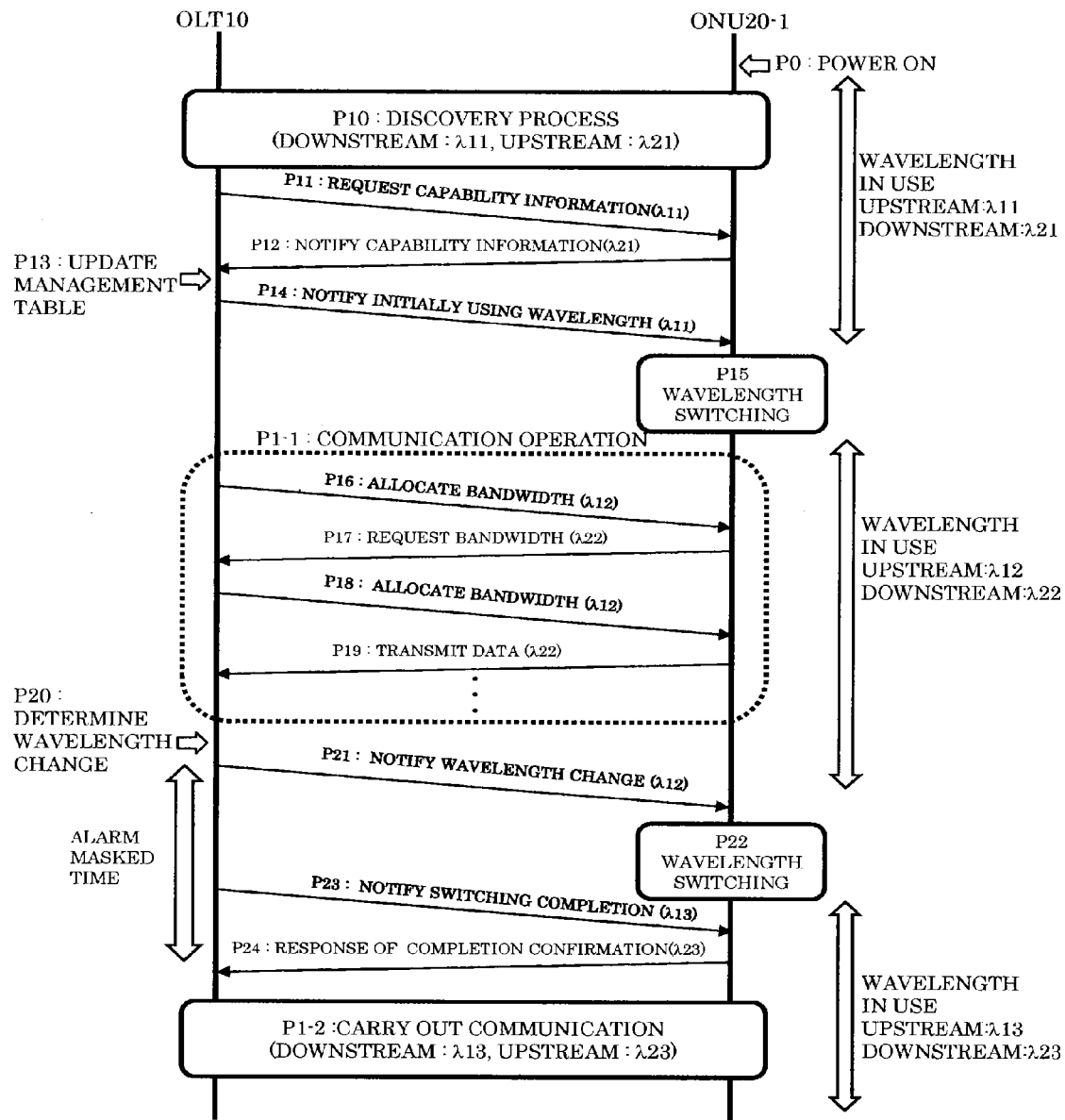

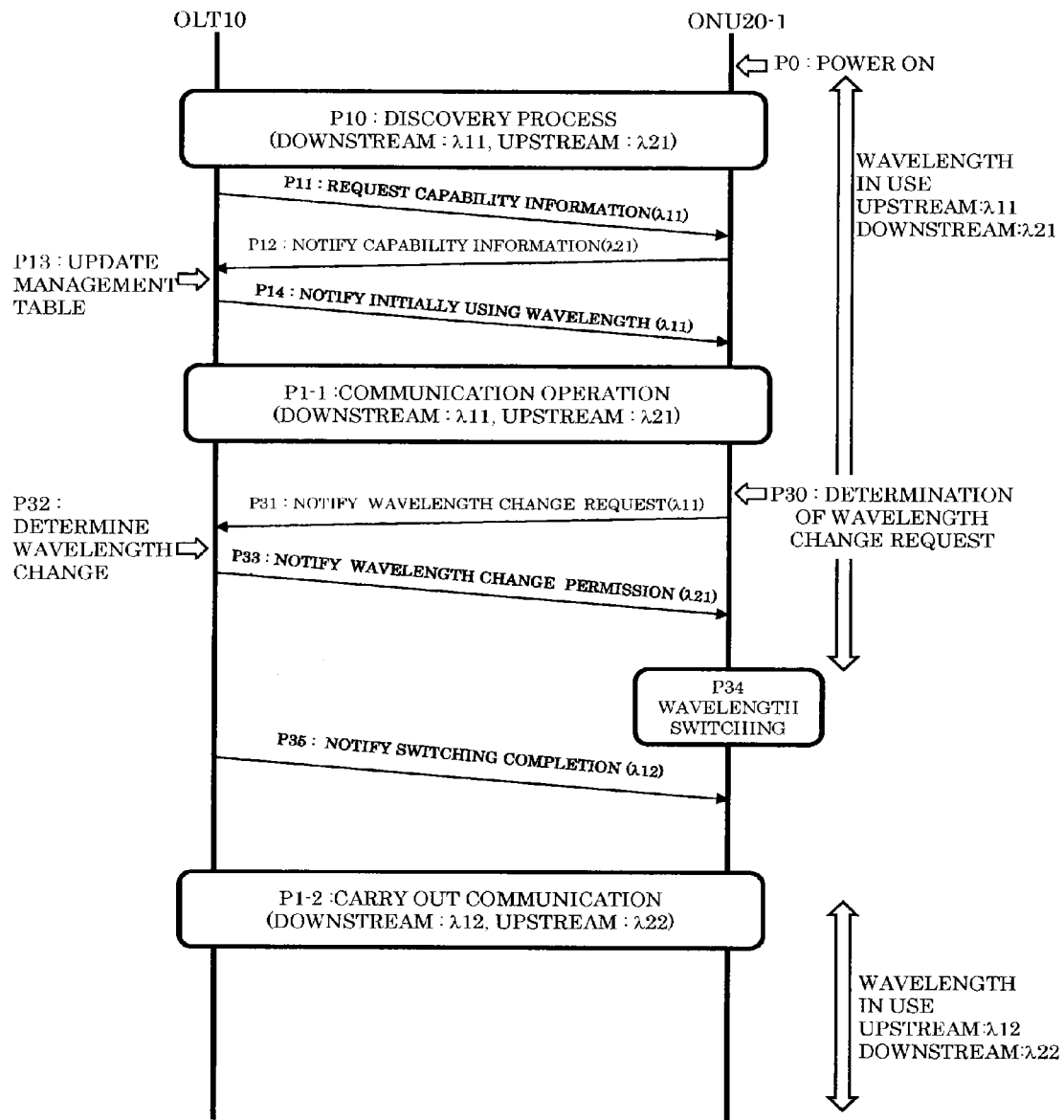

COMMUNICATION SYSTEM, MASTER STATION DEVICE, SLAVE STATION DEVICE, CONTROL UNIT, AND COMMUNICATION CONTROL METHOD

TECHNICAL FIELD

The present invention relates to a communication system in which a master station device and a plurality of slave station devices are connected by a common line, and relates to a communication control method, the master station device, the slave station device, and a control unit, which can be applied to the communication system, for example, such as a PON (Passive Optical Network) system composed of an OLT (Optical Line Terminal: station-side terminal device) and a plurality of ONUs (Optical Network Unit: user-side terminal device).

DESCRIPTION OF THE RELATED ART

In an access network that connects a station side (master station device) with a user side (slave station device), an optical communication system including the PON system has been spreading rapidly so far owing to high-speed performance and economic efficiency. The amount of data that users use has tended to increase every year, and the transmission rate in the PON system has been increased stepwisely, i.e. 150M/bps, 600M/bps, 1G/bps, and 10G/bps. In the future, it is highly probable that there will be a demand for a further increase in the capacity. However, there exists a problem that technology for a device such as an optical transceiver does not meet the demand for realizing a higher transmission rate cost-effectively.

In order to solve the problem, a method of multiplexing a plurality of wavelengths in an optical signal used for data transmission has been proposed, and by the method, the capacity can be increased not by high-rate transmission of each wavelength but by the multiplexing (for example, refer to Patent Document 1).

PRIOR ART DOCUMENT

Patent Document

Patent Document 1: Japanese Unexamined Patent Publication No. 2006-157847

SUMMARY OF THE INVENTION

Problems to be Solved by the Invention

In a conventional optical communication system in which wavelength multiplexing is performed, since an ONU serving as a slave station device can use only one wavelength out of a plurality of wavelengths, it is inconvenient in operation management and procurement of ONUs. Because of this, it is desirable that a wavelength that an ONU receives or transmits is changeable and one type of ONU can deal with any one of the wavelengths (colorless ONU). In order to carry out smooth communication between the OLT serving as a master station and the ONU that is operable with a wavelength switched within a plurality of wavelengths, it is necessary in the system operation that the wavelength changeable ONU properly selects a wavelength to be used out of a plurality of wavelengths.

The present invention has been made to overcome the above problem, and an object thereof is that, in a communication system in which a master station device and a plurality of slave station devices are connected by a transmission line and at least one of upstream communication and downstream communication is carried out using a plurality of wavelengths, a wavelength that the wavelength changeable ONU uses is more properly selected, and thus communication between ONUs and an OLT is smoothly carried out.

Means for Solving the Problems

In a communication system in which a master station device and a plurality of slave station devices are connected by an optical transmission line, and at least one of upstream communication and downstream communication is carried out using a plurality of wavelengths, the master station device includes: a control unit that assigns a wavelength to be used in the communication to the slave station device, and that generates a control signal for notifying the slave station device of the assigned wavelength; and an optical transmitter that transmits the control signal generated by the control unit to the slave station device; and the slave station device includes: an optical transceiver that carries out communication with the master station device using the wavelength based on the control signal received from the master station device.

Further, a master station device according to the invention is applicable to a communication system in which a master station device and a plurality of slave station devices are connected by an optical transmission line, and at least one of upstream communication and downstream communication is carried out using a plurality of wavelengths, and the master station device includes: a control unit that assigns a wavelength to be used in the communication to the slave station device and generates a control signal for notifying the slave station device concerned of the assigned wavelength; and an optical transmitter that transmits the control signal generated by the control device to the slave station device concerned.

Furthermore, a slave station device according to the invention is applicable to a communication system in which a master station device and a plurality of slave station devices are connected by an optical transmission line, and at least one of upstream communication and downstream communication is carried out using a plurality of wavelengths, and the slave station device includes an optical transceiver that receives, from the master station device, a control signal including information on a wavelength assigned to its own device by the master station device, and carries out communication with the master station device using the wavelength based on the received control signal.

Moreover, a control unit according to the present invention is applicable to a master station device in a communication system in which a master station device and a plurality of slave station devices are connected by an optical transmission line, and at least one of upstream communication and downstream communication is carried out using a plurality of wavelengths, wherein a wavelength to be used in the communication is assigned to the slave station device, and a control signal for notifying the slave station device concerned of the assigned wavelength is generated.

In addition, a control unit according to the invention is applicable to a slave station device in a communication system in which a master station device and a plurality of slave station devices are connected by an optical transmission line, and at least one of upstream communication and downstream communication is carried out using a plurality of wavelengths, wherein the control unit controls an optical transceiver of the slave station device so as for the optical transceiver to be able to use a wavelength based on a control signal including information, received from the master station device, on a wavelength assigned to the slave station device concerned by the master station device.

Furthermore, a communication control method according to the invention is applicable to a communication system in which a master station device and a plurality of slave station devices are connected by an optical transmission line, and at least one of upstream communication and downstream communication is carried out using a plurality of wavelengths, and the method includes: a notification step wherein the master station device assigns a wavelength to be used in the communication to the slave station device and notifies the slave station device of the assigned wavelength; and a data transmission and reception step wherein the slave station device performs, on the basis of the notified wavelength from the master station device in the notification step, data transmission or data reception with the master station device.

Effect of the Invention

According to the present invention, in a communication system in which a master station device and a wavelength changeable slave station device are connected by a transmission line and at least one of upstream communication and downstream communication is carried out using a plurality of wavelengths, a wavelength used by a wavelength changeable ONU is more properly selected, so that communication between ONUs and an OLT can be smoothly carried out.

BRIEF DESCRIPTION OF THE DRAWINGS

FIG. 3 is an example of a format for capability information notification in the communication system according to Embodiment 1 of the invention;

FIG. 4 is an example of an ONU management table managed by an OLT of the communication system according to Embodiment 1 of the invention;

FIG. 5 is an example of a format for notification of a wavelength used in the communication system according to Embodiment 1 of the invention;

FIG. 6 is a sequence diagram showing operation of the communication system according to Embodiment 1 of the invention;

FIG. 7 is a sequence diagram showing operation of a communication system according to Embodiment 2 of the invention.

EMBODIMENTS FOR CARRYING OUT THE INVENTION

Embodiment 1

Figure 1:
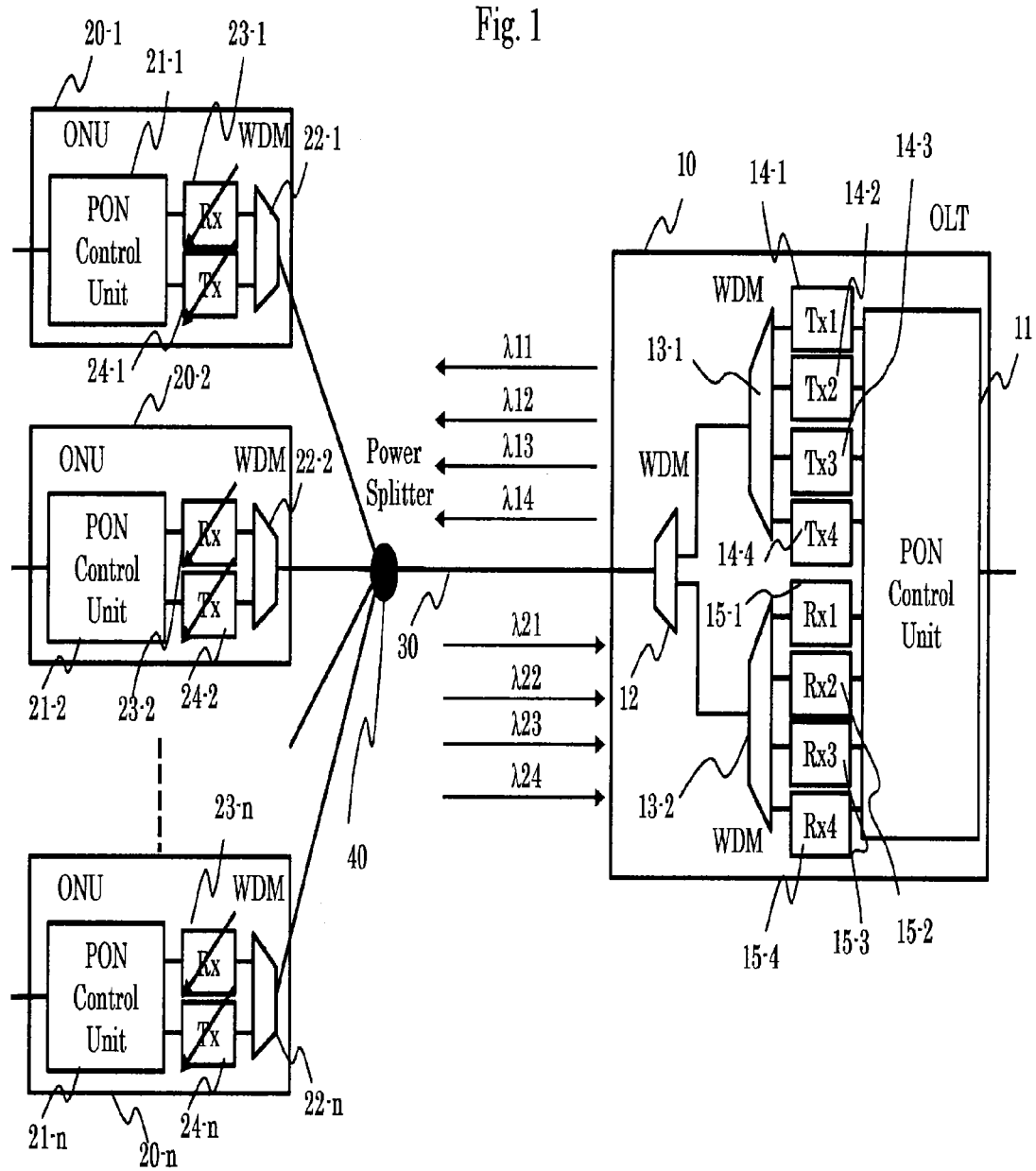
FIG. 1 is a block diagram showing a configuration of a communication system according to Embodiment 1 of the invention.

A communication system to which the present invention is applied will be described taking a PON system as an example. Note that, the invention can be applied to an optical communication system other than the PON system without deviating from the spirit of the invention. FIG. 1 shows a configuration example of the PON system according to the present embodiment. In FIG. 1, the PON system according to Embodiment 1 includes a station-side terminal device 10 serving as a master station device (Optical Line Terminal, hereinafter appropriately abbreviated as OLT) and user-side terminal devices 20-1~n (n=2, 3, . . . ) serving as slave station devices (Optical Network Unit appropriately abbreviated as ONU). It should be noted that only three ONUs are shown in this figure and the other ONUs are omitted, however, any number of ONUs may be applicable in the invention. Further, in figures and the following description, a plurality of devices of the same type, etc. existing within the communication system are distinguished by adding "-" and a numeral after the reference character (for example, ONU20-1). Also in figures and the following description, when devices concerned, etc. are collectively called or do not need to be distinguished, the devices are described using a reference character without "-" such as ONU 20 (for example, ONU 20).

The OLT 10 and a plurality of ONUs 20 share a part of a subscriber line 30, and the subscriber line 30 branches in accordance with the number of ONUs 20-1~n through a power splitter 40. A terminal (not shown in FIG. 1) is connected to each of the ONUs 20 and the OLT 10 is connected to a host network (not shown in FIG. 1). The subscriber line 30 is an optical transmission line and an optical fiber is assumed to be used in this case. Further, the subscriber line 30 and the power splitter 40 can transmit, distribute, and synthesize optical signals of a plurality of wavelengths and are assumed to handle optical signals of wavelengths $\lambda11$~$\lambda14$ and wavelengths $\lambda21$~$\lambda24$ in this case. Furthermore, the direction from the OLT 10 to the ONU 20 is defined to be a downstream direction, and communication therein is assumed to be downstream communication. Similarly, the direction from the ONU 20 to the OLT 10 is defined to be an upstream direction, and communication therein is assumed to be upstream communication.

The OLT 10 includes a PON control unit 11 for performing a process in the OLT side on the basis of a PON protocol and WDM (Wavelength Division Multiplexing) couplers (WDM) 12, 13-1, 13-2 for multiplexing optical signals having different wavelengths. Although omitted in FIG. 1, the OLT 10 also includes a reception buffer serving as a buffer for storing upstream data received from the ONU 20 and a transmission buffer serving as a buffer for storing downstream data transmitted to the ONU 20, and a physical layer processor (PHY) for realizing a physical interface function of a NNI (Network Node Interface) between the OLT 10 and the host network.

The PON control unit 11 of the OLT 10 performs bandwidth allocation of upstream data so that transmission permission to each ONU 20 will be given in such a way that a transmission time period and a wavelength in use do not overlap with each other, thereby preventing collision of transmission data from each ONU 20. Furthermore, the PON control unit 11 holds a management table regarding wavelength switching capability, etc. of the ONU 20. Referring to the management table, the OLT 10 can also determine a post-switched wavelength (reallocated wavelength) when switching a wavelength of the ONU 20.

Moreover, the OLT 10 includes each of optical transmitters (Tx) 14-1~4 for performing transmission processing of optical signals, in which a process for transmitting the optical signal of each of wavelengths $\lambda 11 \sim \lambda 14$ can be performed, respectively. The optical signals transmitted from the optical transmitters (Tx) 14-1~4 are wavelength multiplexed in the WDM (Wavelength Division Multiplexing) coupler (WDM) 13-1, and the upstream data and the downstream data are wavelength multiplexed in the WDM 12.

The OLT includes each of optical receivers (Rx) 15-1~4 for performing reception processing of optical signals, in which the optical signal of each of wavelengths $\lambda 21 \sim \lambda 24$ can be received, respectively. The optical signals received from the ONUs 20 and separated by the WDM 12 are separated into optical signals of the wavelengths $\lambda 21 \sim \lambda 24$ by the WDM 13-2, and reception processing for the signals is performed by the respective optical receivers (Rx) 15-1~4.

The ONU 20 includes a PON control unit 21 for performing a process in the ONU side on the basis of a PON protocol; a WDM 22 for multiplexing upstream signals and downstream signals in the ONU side. Although omitted in FIG. 1, the ONU 20 also includes a transmission buffer (upstream buffer) serving as a buffer for storing transmission data (upstream data) transmitted to the OLT 10 and a reception buffer (downstream buffer) serving as a buffer for storing reception data (downstream data) received from the OLT 10, and each physical layer processor (PHY) for realizing a physical interface function of an UNI (User Network Interface) between the ONU 20 and a terminal connected thereto.

The ONU 20 includes an optical transceiver for performing transmission processing of an optical signal, which is composed of an optical receiver (Rx) 23 and an optical transmitter (Tx) 24. The optical receiver (Rx) 23 can perform reception processing for optical signals of the wavelengths $\lambda 11 \sim \lambda 14$. Further, the optical transmitter (Tx) 24 can perform transmission processing for optical signals of the wavelengths $\lambda 21 \sim \lambda 24$. The upstream data and the downstream data are wavelength multiplexed in the WDM 22. In this example, it is assumed that the optical receiver (Rx) 23 of the ONU 20 is a wavelength changeable optical receiver and can receive an optical signal of any one wavelength out of the wavelengths $\lambda 11 \sim \lambda 14$ by switching a filter etc. Similarly, it is assumed that the optical transmitter (Tx) 24 is a wavelength changeable optical transmitter and can transmit an optical signal of any one wavelength out of the wavelengths $\lambda 21 \sim \lambda 24$ by switching a filter etc.

As described above, in the PON system disclosed in the present embodiment, communication can be possible using wavelengths $\lambda 11 \sim \lambda 14$ for the downstream direction (direction from OLT to ONE) and $\lambda 21 \sim \lambda 24$ for the upstream direction (the direction from the ONU to the OLT), and the ONU 20 carries out communication using a signal of a wavelength selected from these wavelengths in each of the upstream and downstream directions. Furthermore, the OLT 10 notifies the ONU 20 of a wavelength to be used and a communication bandwidth, and by the time division multiplexing of each wavelength, the OLT 10 carries out communication without collision of optical signals from each ONU 20. Note that, it is a matter of course that the number of wavelengths used for the transmission or the reception is not limited to this example.

Figure 2:
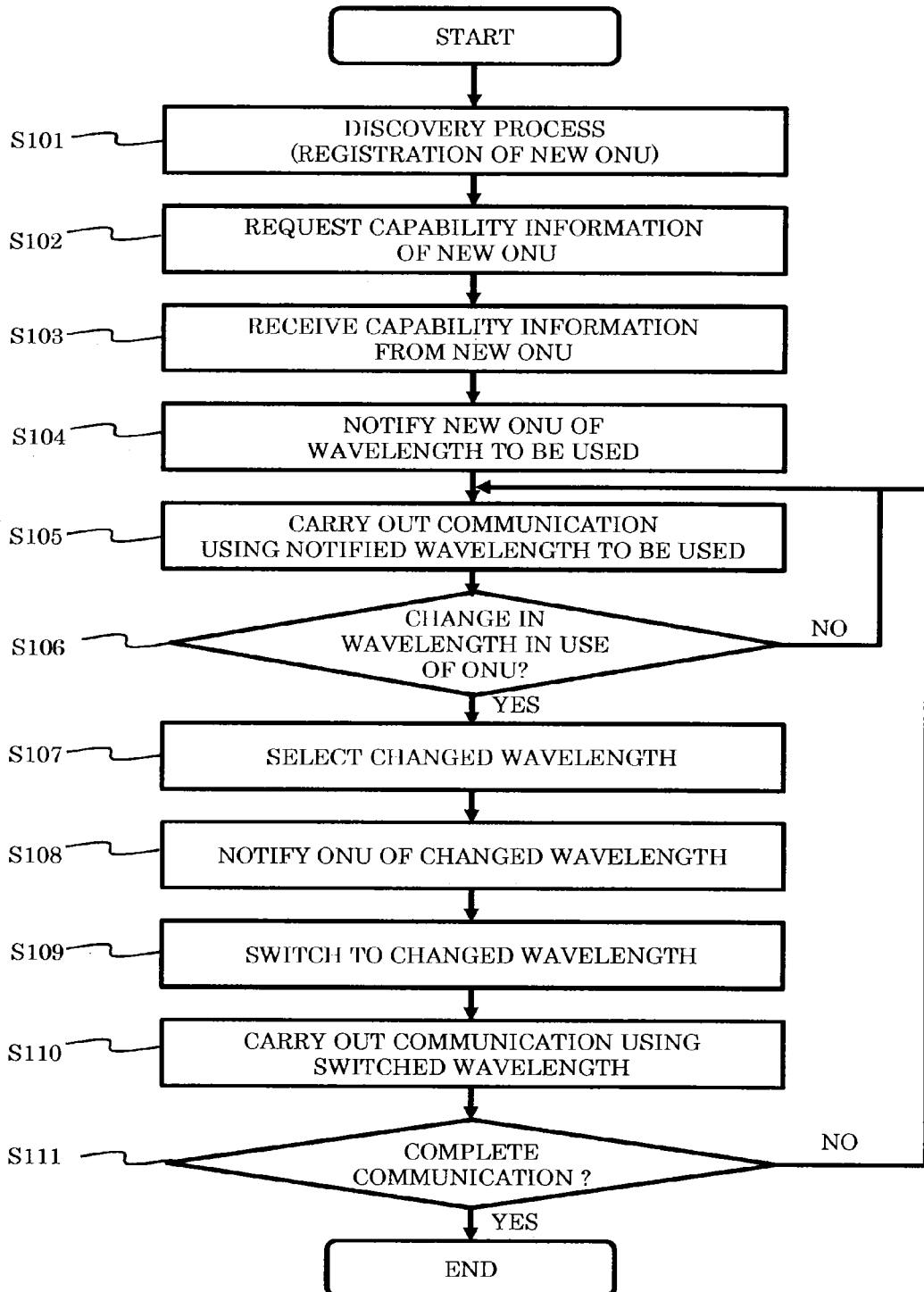
FIG. 2 is a flow chart showing operation of the communication system according to Embodiment 1 of the invention.

Next, overall operation in this embodiment will be described. FIG. 2 shows a flow chart regarding operation of a communication system according to Embodiment 1 of the invention. In the description hereinafter, an exemplary case will be explained in which the ONE 20 that can transmit and receive all available wavelengths in the PON system (downstream direction: $\lambda 11 \sim \lambda 14$, upstream direction: $\lambda 21 \sim \lambda 24$) is powered on, and a terminal that is connected to the ONU 20 carries out communication with a host network via the OLT, and then a wavelength in use of the ONU 20 (wavelength used for transmission and reception) is to be switched.

The OLT 1 performs a discovery process in order to register an ONU 20 that is newly connected (powered on) (Step S101). When the newly connected ONU is registered in the discovery process, the OLT requests the ONU 20 to notify the OLT of capability information in order to collect capability information on wavelength switching (Step S102). The ONU 20 receiving this request notifies the OLT of capability information regarding available wavelengths of its own device, a switching time, and the like, and the OLT 10 receives this information, grasps capability information on the newly registered ONU (Step S103). On the basis of the notified capability information, the OLT assigns a wavelength to be used for the ONU and notifies the ONU 20 of the assigned wavelength (Step S104).

The ONU 20 notified of the wavelength to be used carries out communication with the OLT 10 using the wavelength based on the notification (Step S105). When predetermined conditions are satisfied and the OLT 10 determines that a wavelength in use of a specific ONU 20 needs to be changed during communication carried out between the OLT 10 and the ONU 20 (Step 106), the OLT 10 side selects a wavelength to be used by the ONU whose wavelength in use needs to be changed (Step 107), and notifies the ONU 20 of a post-switched (reallocated) wavelength (Step 108). The ONU 20 notified of the wavelength change performs its own wavelength switching operation and switches its wavelength to the wavelength notified from the OLT 10 (Step S109), and carries out communication with the OLT 10 using the post-switched wavelength (Step S110). Furthermore, when the OLT determines that the communication needs to be completed, the communication is completed, and when the communication needs to be continued, the flow moves to Step S105 (Step S111). Hereinafter, the detail of each process will be described.

First, the discovery process (Step S101) will be described. In the discovery process, the OLT 10 performs a registration process for the ONU 20 that is newly connected to the PON system and issues an ID for each ONU 20. The OLT 20 performs the discovery process using a predetermined base wavelength ($\lambda 11$ in this case). That is, the PON control unit 11 of the OLT 20 generates a control signal for the discovery and outputs it to the optical transmitter (Tx1) 14-1 that can transmits an optical signal of the wavelength $\lambda 11$. The optical transmitter (Tx1) 14-1 that receives the control signal for the discovery periodically transmits the control signal for the discovery to the ONU 20.

The ONU 20 when powered on, are set up so as to be able to receive an optical signal of the base wavelength, and when receiving the control signal for the discovery from the OLT 10, it transmits to the OLT 10 a registration request signal including its own identification number etc. within an allocated time notified using the control signal for the discovery. The optical transmitter (Rx) 24 when powered on, is also set up so as to be able to transmit an optical signal of a predetermined base wavelength ($\lambda 21$ in this case), and transmits a registration request signal to the OLT 10 using the wavelength λ21. As described above, by predetermining the wavelength used for the discovery process, the discovery process can be performed even if the ONU 20 is configured to receive one of a plurality of wavelengths selectively. Note that, it is not necessary that the base wavelength is exclusively used for the discovery process and a part of the bandwidth in the wavelengths for carrying out data communication may be used.

Here, the configuration is described in which a predetermined base wavelength is used for the discovery process; however, this is not a limitation. For example, the OLT 10 transmits the control signal for the discovery using all the wavelengths (λ11~λ14) for the downstream direction that are used for the PON system, so that the ONU 20 may receive the control signal of any one of the wavelengths for the discovery, and transmit a registration request signal to the OLT 10 on the basis of a wavelength and a transmission time period specified by the received control signal for the discovery.

The OLT 10 that receives the registration request signal from the ONU 20 issues a LLID (Logical Link ID) for the ONU 20, registers the ONU 20 in its own device, and transmits registration completion notification to the ONU 20 that has been registered, and then completes the discovery process. Further, in the discovery process, the OLT measures a delay time (Round Trip Time, hereinafter, appropriately called RTT) using the control signal described above, and manages it in association with the LLID.

Notification operation (Steps S102, S103) of the capability information for collecting the capability information of the ONU 20 will be described. Using an optical signal of the base wavelength λ11, the OLT 10 requests notification of the capability information to the ONU 20 whose registration process is completed (capability information request signal). The ONU 20 that receives the capability information request signal transmits, to the OLT 10, information (capability information) on usable wavelengths of its own device and a switching time needed to switch its wavelength to the other wavelength. In FIG. 3, an example of a format for the capability information notification is shown. In the example shown in FIG. 3, information on the wavelength switching of the ONU 20 can be notified. This includes an ID issued to its own device, the fact that the optical transceiver included in its own device is capable of receiving optical signals of wavelengths ranging from λ11 to λ14 and transmitting optical signals of wavelengths ranging from λ21 to λ24, and a switching time t1 needed to switch from a specific wavelength to another wavelength, etc.

Although the wavelength that is used for carrying out the capability information notification is the same wavelength (base wavelength) as the discovery process described above, another wavelength may be used. When another wavelength is used, the ONU 20 may be notified of the wavelength used for the capability information notification, during the discovery process described above or using the wavelength for performing the discovery process. Alternatively, similar to the discovery process, the wavelength to be used (for example, λ12) may be predetermined. Note that, although a case is described here in which the capability information notification is carried out after completing the discovery process, the notification may be carried out within the discovery process described above.

Furthermore, the OLT 10 that is notified of the capability information from the ONU 20 updates an ONU management table managed by its own device. FIG. 4 shows an example of the ONU management table. In FIG. 4, such pieces of information as an ID issued to each ONU, usable wavelengths (Rx, Tx), a wavelength that is actually used, and a switching time are managed in association with each other in the ONU management table. When the capability information is received from the ONU 20, the ONU management table is updated on the basis of the received capability information. From the example shown in FIG. 4, it is understood that, for the ONU whose ID=1, the usable downstream and upstream wavelengths are λ11~λ14 and λ21~λ24, respectively and the switching time is t1. Similarly, it is understood that, for the ONU whose ID=2, the usable downstream and upstream wavelengths are only λ11 and λ21, respectively and the switching time is t2. These pieces of information are managed for each ONU 20 registered in the OLT 10.

Next, notification operation (Step S104) will be described, in which the OLT 1 notifies an ONU 20 that completes the discovery process, etc. of a wavelength (initial wavelength) used in the PON system. Note that, this operation can be omitted when the initial wavelength is predetermined under a contract, etc.

The ONU 20 that completes the discovery process, etc. is notified of the initial wavelength from the OLT 10. FIG. 5 shows an example of a format for an initially-used wavelength notification. In the example shown in FIG. 5, notification for the ONU 20 whose ID=1 is made that the wavelengths to be used (operating wavelengths) are λ12 for the downstream direction and λ22 for the upstream direction. Although the initial wavelength may be any one of the wavelengths that can be used by the ONU 20 that receives this notification, here, the OLT 10 determines the initial wavelength of the ONU 20 using one of the following methods (A1)~(A3) or using a combination of these methods, and notifies the ONU 20 of it.

(A1) Wavelength Predetermined Under a Contract, Etc.

The initial wavelength is predetermined by a contract with a user, and the information on the wavelength is held in association with the ONU 20 in the OLT 10, and the corresponding initial wavelength is notified to the ONU 20 when the ONU 20 is ready for communication. Predetermining the wavelength to be used enables rapid initiation of communication. Further, making the wavelength be ready for use automatically in the ONU 20 side when the discovery process, etc. are completed may lead to a configuration in which the notification of the wavelength to be used is not needed.

(A2) Wavelength Determined on the Basis of the Order of Priority

The order of priority in the usage of wavelengths and maximum allowable number of ONUs for each wavelength are predetermined, and the initial wavelength of the ONU 20 is determined on the basis of the priority. For example, the highest priority for the downstream direction is assumed to be the wavelength λ11 (base wavelength), and the priority is set in the order of λ12, λ13, and λ14. Similarly, for the downstream direction, the priority of λ21 (base wavelength) is assumed to be highest. First, the downstream base wavelength λ11 and the upstream base wavelength λ21 are set as initial wavelengths for a newly registered ONU 20 after the discovery process, etc. are completed. Similar operation is carried out every time when an ONU 20 is newly registered, and when the number of the ONUs 20 that use the downstream base wavelength λ11 and the upstream base wavelength λ21 reaches the maximum allowable number of the ONUs, the downstream wavelength λ12 and the upstream wavelength λ22, both being as the next priority are set to the newly registered ONU 20. By determining the initial wavelength of the ONU 20 in this way, a part of the wavelengths need not to be used when the number of ONUs 20 carrying out communication is small, so that turning off optical transceivers that are relevant to the unused wavelengths enables power saving operation.

(A3) Wavelength Having a Low Usage Rate

The OLT 10 monitors the amount of traffic between the OLT 10 and the ONU 20, and calculates a usage rate of each wavelength. When the discovery process, etc. are completed and a new ONU 20 is registered, a wavelength having a low usage rate is determined to be the initial wavelength of the ONU 20. Preferentially using a wavelength having a low usage rate enables more efficient allocation of the bandwidth to each user.

Note that, the number of wavelengths for use being notified may not be one. That is, a configuration may be possible where the ONU 2 notifies the OLT of a plurality of usable wavelengths and the ONU 20 side selects a wavelength to be used.

The ONU 20 that is notified of the initial wavelength from the OLT 10 carries out communication with the OLT 10 using the notified wavelength. An example here is described in a case where wavelengths in use are the downstream base wavelength $\lambda 11$ and the upstream base wavelength $\lambda 21$. The PON control unit 11 stores downstream data (downstream communication data), which is received from a host network via the PHY, in the transmission buffer in the OLT 10 side. When the data is transmitted from the OLT 10, the PON control unit 12 reads out the downstream data stored in the transmission buffer and outputs it to the optical transmitter (Tx) 14-1 that can transmits an optical signal of the wavelength $\lambda 11$; the optical transmitter (Tx) 14-1 outputs transmission data as an optical signal; the WDM 13-1 and the WDM 12 perform wavelength multiplexing and the result is outputted as a downstream signal to the ONU 20 via the subscriber line 30.

Further, when the PON control unit 11 transmits control signals such as transmission bandwidth allocation, etc. for transmitting a transmission permission instruction, the control signals generated by the PON control unit 11 are outputted to the optical transmitter (Tx) 14-1, and then the transmission to the ONU 20 is performed in the same way as the downstream data is transmitted.

When the ONU 20 receives a downstream signal from the OLT 10, the WDM 22 separates the downstream signal and outputs it to the optical receiver (Rx) 23. The optical receiver (Rx) 23 is set up so as to be able to receive an optical signal of the wavelength $\lambda 11$ and the optical receiver (Rx) 23 converts the downstream signal to an electrical signal and outputs it to the PON control unit 21. The PON control unit 21 stores the downstream data outputted from the optical receiver (Rx) 23 in the reception buffer. The PON control unit 21 reads out the downstream data stored in the reception buffer, and outputs the data to the PHY in accordance with the destination of the data. The PHY that receives the downstream data performs predetermined processing for the downstream data and transmits the result to the terminal connected to its own device.

In contrast, when the ONU 20 transmits upstream data, the PON control unit 21 stores the upstream data, which is obtained via the PHY from the terminal connected to the ONU20, in the transmission buffer in the ONU 20 side, and reads out the upstream data stored in the transmission buffer on the basis of the transmission bandwidth given from the OLT 10 and outputs the data to the optical transmitter 24. The optical transmitter (Tx) 24 which is switched so as to be able to transmit an optical signal of the wavelength $\lambda 21$ for use being notified from the OLT 10, converts the upstream data to an optical signal (upstream signal), and transmits the signal to the OLT 10 via the WDM 22 and the subscriber line 30.

The PON control unit 11 of the OLT 1 stores the upstream data in the reception buffer, which is received from the ONU 20 via the subscriber line 30, the WDM 12, 13-2, and the optical receiver (Rx1) 15-1. Furthermore, the PON control unit 11 reads out the upstream data stored in the reception buffer and outputs the data to a host network via the PHY.

Next, changing operation of the wavelength in use of the ONU 20 (Step S106) will be described. The OLT 10 determines the change in wavelength in use for a specific ONU 20 when certain predetermined conditions are satisfied, and assigns a new wavelength to the ONU 20 subjected to the change. Any criterion may be used for the conditions on which the wavelength of the ONU 20 is switched. In this case, one of the following (B1) and (B2) or a combination thereof is assumed to be used.

(B1) Traffic Monitoring

The OLT 10 monitors the amount of traffic for each wavelength in the PON system, and when the amount of traffic of a wavelength reaches more than a predetermined value, the OLT determines the change in wavelength in use in a specific ONU 20 that uses the wavelength. In addition, a bandwidth usage rate may be used as a condition to change the wavelength.

(B2) Monitoring the Allowable Number of ONUs Per Each Wavelength

The OLT 10 monitors the number of ONUs 20 per each wavelength, and when the number of ONUs 20 allowed for a specific wavelength reaches more than a predetermined number (maximum allowable number of ONUs), the OLT determines the change in wavelength in use in a specific ONU 20 (for example, a newly registered ONU) that uses the wavelength.

When the wavelength switching is determined on the basis of the wavelength switching trigger described above, the OLT 10 generates a control signal (holdover message) to notify a specific ONU, which uses the wavelength determined to be switched, of wavelength switching execution, and transmits the holdover message to the ONU 20. Although an ONU 20 subjected to the change in wavelength in use depends on a choice from the operator side, rules such as described below may be set up, i.e., for example, the wavelength change is not performed for a user who does not allow instantaneous interruption of communication by a contract, or the wavelength change is determined for an ONU 20 having a large amount of traffic on the basis of a past communication record obtained by monitoring the amount of traffic for each ONU 20.

When the wavelength switching is performed, the OLT 10 determines a post-switched wavelength on the basis of the capability information notified from an ONU 20. That is, the OLT 10 manages the wavelengths that are usable in each ONU 20 and gives an ONU 20 subjected to the switching an instruction (or request) to switch the wavelength to a usable wavelength.

The wavelength may be switched to any one of the wavelengths that are usable in an ONU 20 subjected to the switching. In this case, similar to the way to determine the initial wavelength described above, a reallocated wavelength is determined by one of the following methods (C1)~(C3) or a combination thereof.

(C1) Wavelength Predetermined Under a Contract, Etc.

A wavelength subjected to the change is predetermined by a contract with a user, etc.

(C2) Wavelength Determined on the Basis of the Order of Priority

The order of priority in the wavelength usage and the maximum allowable number of ONUs for each wavelength are predetermined, and a reallocated wavelength of an ONU 20 is determined on the basis of the order of priority.

(C3) Wavelength Having a Low Usage Rate

The OLT 10 monitors the amount of traffic between the OLT 10 and the ONU 20, and calculates a usage rate for each wavelength. When a wavelength in use of an ONU 20 is changed, a wavelength having a low usage rate is determined to be a reallocated wavelength of the ONU 20.

Furthermore, in a case where a wavelength interval between adjacent wavelengths among a plurality of wavelengths used in the PON system is small (small wavelength difference), the wavelength may be switched not to adjacent wavelengths but to one of the other wavelengths. For example, assuming that the wavelength is set to be longer in the order of from λ11 to λ14 and the intervals between the adjacent wavelengths are small, the wavelength λ11 used in an ONU 20 is switched not to the adjacent λ12 but to λ13 or λ14. In a case where an interval (wavelength difference) between adjacent wavelengths is small, since a change in an output wavelength due to a temperature variation, etc. cannot be neglected, temperature compensation, etc. are necessarily. In a case where there is a margin in the bandwidth in use, using a wavelength away from an adjacent one is effective in that temperature compensation, etc. are not necessary.

An ONU 20 that receives an instruction (or request) for the wavelength change from the OLT 10 switches the wavelength that has been used so far to one of the other wavelengths in one of or both of the optical transmitter and receiver of its own device. A wavelength-change notification received by the optical receiver (Rx) 23 of the ONU 20 is converted to an electrical signal and is outputted to the PON control unit 21. The PON control unit 21 that receives the wavelength-change notification extracts a wavelength to be used by its own device included in the wavelength-change notification, and controls the optical transceiver so that the wavelength to be used can be usable. That is, the PON control unit 21 that receives the wavelength-change notification generates a control signal for the switching to the wavelength to be used and outputs the signal to the optical transceiver. The optical transceiver that receives the control signal for the switching switches variable filters, etc. of the optical receiver 23 and the optical transmitter 24 so as for the optical receiver to be able to receive an optical signal of the post-switched wavelength and so as for the optical transmitter 24 to be able to transmit an optical signal of the post-switched wavelength. In this situation, the ONU 20 changes a transmission and a reception wavelength while keeping the LLID and an authentication state.

In this case, a communication stop state (holdover state) is held during the period of wavelength switching, and instantaneous interruption of communication occurs. In the PON system, when a signal from each ONU 20 does not reach the OLT 10 for a certain period of time, an alarm (LOB (Loss of Burst) alarm) is generated. However, an alarm regarding an ONU 20 that receives the wavelength-switching instruction (or request) is masked, and it is not regarded as an alarm even if the ONU is not responding. That is, the OLT 10 that transmits wavelength switching notification starts a timer as a reference for alarm suppression, and the alarm before the timer expires is not regarded as an alarm, and thus disconnection of the link, etc., which are performed when an alarm is issued, is not performed. Further, when a configuration is adopted in which the ONU 20 that receives the wavelength switching notification starts the switching operation after transmitting response notification, the OLT 10 starts the timer after receiving the response notification from the ONU 20 responding to the wavelength-change notification. In this operation, the timer is set in consideration of the switching time notified from the ONU 20 and the RTT, etc. Owing to the above operation, a false detection of a failure stemming from the switching time of the ONU 20 can be avoided.

Referring to the ONU management table updated by receiving the notification of the capability information from an ONU 20, the OLT 10 estimates the time needed to complete switching (holdover completion time) on the basis of the switching time of the ONU 20 that performs switching operation. When the estimated holdover completion time is reached, the OLT 10 transmits switching completion notification to the ONU 20 under the switching operation, making the ONU 20 complete the switching operation. Thereafter, the ONU 20 carries out communication using the reallocated wavelength.

An ONU 20 continues to use an ID assigned thereto in the discovery process even after the wavelength in use is changed. The OLT 10 associates an ONU 20 with a connection point in a host layer using the ID of the ONU 20 as a key. Further, turning off optical transceivers of the OLT 10 relevant to wavelengths that are not used enables power saving operation. For example, in a case where communication with an ONU 20 is carried out using only the downstream wavelengths λ11 and λ12 and the upstream wavelengths λ21 and λ22, power supply to the transmitters (Tx3, Tx4) 14-3, 4 relevant to the downward wavelengths λ13 and λ14 and to the receivers (Rx3, Rx4) 15-3, 4 relevant to the upstream wavelengths λ23 and λ24 is stopped, so that power saving operation can be realized.

In some cases, when wavelength switching operation is newly performed, the OLT 10 does not hold the RTT information regarding the reallocated wavelength. That is, when the reallocated wavelength is used for the first time, a window is set up for remeasuring a distance. The RTT is held after the first time, and a bandwidth is allocated in consideration of the RTT after the reallocation. Note that, when the difference between the wavelengths before and after the switching is small, allocating the bandwidth by temporarily using the RTT of the wavelength before the switching, the OLT 10 carries out communication, and then the RTT may be obtained by measuring a delay time, etc. of the signal in the communication.

It should be noted that, in the communication system according to the present embodiment, although a case is described in which there coexist in the PON system an ONU capable of using all wavelengths and an ONU capable of using a part of the wavelengths or only a single wavelength, all ONUs may be possible to use all the wavelengths used in the PON system. That is, the present invention is applicable if there exists at least one ONU that can use a plurality of wavelengths at least in one communication direction out of the downstream direction (OLT ⇒ ONU) and the upstream direction (ONU ⇒ OLT) within the communication system. In the following other embodiments, the same can be applied as well.

The operation described above will be explained using a sequence diagram. FIG. 6 illustrates a sequence diagram showing operation of the communication system according to the present embodiment. Here, the description will be given assuming that the ONU 20-1 that can transmit and receive optical signals of the downstream wavelengths λ11~λ14 and upstream wavelengths λ21~λ24 by switching the optical transceiver, is powered on and carries out communication with the OLT 10.

When the ONU 20-1 is powered on (P0), the ONU 20-1, which is set in a state ready to receive an optical signal of the base wavelength λ11, receives a control signal for the discovery from the OLT 10 and performs the discovery process (P10). The discovery process is performed using predetermined wavelengths (base wavelengths), λ11 for the downstream wavelength and λ21 for the upstream wavelength. When the ONU 20-1 is registered after the discovery process is completed, the OLT 10 transmits capability information request notification to the ONU 20-1 (P11). The ONU 20-1 that receives the capability information request notification transmits, to the OLT 10, capability information including usable wavelengths of its own device (in this case, the downstream wavelengths: λ11~λ14, the upstream wavelengths: λ21~λ24) and a switching time (in this case, t1) (P12).

The OLT 10 that receives the capability information from the ONU 20-1 updates the ONU management table held by its own device, and registers that λ11~λ14 for the downstream wavelengths and λ21~λ24 for the upstream wavelengths are usable in the ONU 20-1 and that the switching time thereof is t1 (P13). The OLT 10 determines the wavelength to be used by the ONU 20-1 and notifies the ONU 20-1 of the wavelength determined (the wavelength if predetermined under a contract, etc.) (P14). In this case, the wavelengths to be used by the ONU 20-1 for the downstream direction and the upstream direction are assumed to be λ12 and λ22, respectively. Note that, these signal exchanges between the OLT 10 and the ONU 20-1 so far are performed using the base wavelengths (downstream wavelength: λ11, upstream wavelength: λ21).

The ONU 20-1 that receives notification of the initially-used wavelength (downstream wavelength: λ12, upstream wavelength: λ22) switches the wavelengths (P15). Note that, when the base wavelengths that are used for the discovery process, etc. are notified in the initially-used wavelength notification, this switching operation is not performed. After completing the switching to the wavelength to be used, the ONU 20-1 performs operation for data communication using a signal of the wavelength (P1-1, P16~P19).

The OLT 10 carries out communication using the downstream wavelength λ12 and the upstream wavelength λ22 for a while, and in a case where communication using these wavelengths becomes congested and the OLT 10 determines that a shortage of bandwidth occurs, it determines the switching of the wavelength in use of the ONU 20-1 (P20). In the wavelength switching, the wavelength to be used by the ONU 20-1 is determined on the basis of the ONU management table held by its own device and the usage rate of each wavelength, etc. When the wavelength to be used by the ONU 20-1 is determined, the wavelength-change notification including notice for the wavelength-change and information about the changed wavelengths is transmitted to the ONU 20-1 (P21).

The ONU 20-1 that receives the wavelength-change notification performs the wavelength switching (P22). The OLT 10 estimates a completion time for the switching and transmits switching completion notification to the ONU 20 when the time is reached (P23). Note that, since the OLT 10 grasps the switching time of the ONU 20-1 by the capability information notification from the ONU 20-1, it can easily estimate the completion time for the switching. Further, the ONU 20, after receiving the holdover massage (holdover completion) from the OLT 10, transmits a response message to the OLT 10 (P24). From this message, the OLT 10 can confirm that the ONU 20 completes the wavelength selection.

The ONU 20 that receives the switching completion notification carries out communication with the OLT 10 using the downstream wavelength λ13 and the upstream wavelength λ23 (P1-2). Through the above operation performed, communication between OLT10 and ONU20 can be carried out by efficiently switching the wavelength.

In the communication system according to Embodiment 1, a master station device determines the wavelength to be used by a slave station device and notifies the salve station of the wavelength as described above, so that the slave station device can carry out communication with the master station by switching the wavelength depending on the situation. Furthermore, the master station device collects capability information on the wavelength switching from the slave station device, so that communication can be carried out by efficiently switching the wavelength even when there exist a different type of slave station devices within the communication system. Further, turning off optical transceivers of the master station device relevant to wavelengths that are not used enables power saving operation.

Embodiment 2

In Embodiment 1, the OLT monitors communication situations, etc., in the communication system and determines to change wavelengths of an ONU. In Embodiment 2, however, a case will be described in which a trigger for starting the wavelength change is a wavelength-change request from an ONU. A configuration of a communication system according to Embodiment 2 is the same as that in Embodiment 1, and is shown in FIG. 1.

Next, operation will be described. A flow chart showing operation of the communication system according to Embodiment 2 is the same as that shown in FIG. 2 and descriptions of operation similar to Embodiment 1 will be omitted and operation different from Embodiment 1 will only be described.

Changing operation of wavelengths in use of an ONU 20 (Step S106) will be described. In Embodiment 1, the decision by the OLT 10 is a trigger for wavelength switching. In Embodiment 2, however, a decision by an ONU 20 is the trigger for wavelength switching. After the discovery process, etc. are completed, and communication between the OLT 10 and an ONU 20 is initiated, and predetermined conditions are satisfied, the decision of requesting a wavelength change is made from the ONU 20 side.

Here, the predetermined conditions are, for example, a bandwidth (communication time) allocated from the OLT 10 to the ONU 20 and monitored remaining capacity of a transmission buffer of its own device, etc. And thus the decision on whether or not to request switching of the wavelength in use is made on the basis of these conditions. In a case when the ONU 20 determines to request the wavelength change, the PON control unit 21 generates a control signal (wavelength-change request notification) that requests the change in wavelength used by its own device, and outputs it to the optical transmitter (Tx) 23. The optical transmitter (Tx) 23 that receives the wavelength-change request signal transmits the signal to the OLT 10 using the wavelength that is currently used in the bandwidth allocated by the OLT 10. Note that, capability information on the wavelength change of its own device may be included in the wavelength-change request signal.

The OLT 10 that receives the wavelength-change request signal from the ONU 20 determines, on the basis of communication situations of the other wavelengths etc., whether or not to change the wavelength of the ONU 20 that transmits the wavelength-change request signal, and then determines a reallocated wavelength if the wavelength change is determined to be performed.

The operation described above will be explained using a sequence diagram. FIG. 7 illustrates a sequence diagram in terms of the operation of the communication system according to Embodiment 2. Similar to the case shown in Embodiment 1, the ONU 20 that is powered on performs the discovery process and notifies the OLT10 of the capability information regarding wavelength switching. The ONU 20 being assigned a wavelength to be used from the OLT 10 carries out communication with the OLT 10 using the wavelength.

The ONU 20 carries out communication using the downstream wavelength λ12 and the upstream wavelength λ22 for a while and communication using these wavelengths gradually becomes congested, and then the ONU 20 determines to request wavelength switching of its own device (P30). In this case, the ONU 20 generates a wavelength-change request signal and transmits the signal to the OLT 10 (P31). The OLT 10 that receives the wavelength-change request determines, on the basis of the ONU management table held by its own device and the usage rate of each wavelength, etc., whether or not to change the wavelengths of the ONU 20, and then determines, on the basis of the same, wavelengths to be used if the wavelengths are determined to be changed (P32). When the wavelengths to be used by the ONU 20-1 are determined, the wavelength-change notification including notice for the wavelength change and information about the changed wavelengths is transmitted to the ONU 20-1 (P33).

The ONU 20 that receives notification of wavelength-change permission (or instruction) from the OLT 10 switches the wavelength that has been used so far to one of the other wavelengths in one of or both of the optical transmitter and receiver of its own device (P34). The OLT 10 estimates the time at which the ONU 20 completes the wavelength switching, on the basis of the switching time notified from the ONU 20, and transmits switching completion notification (holdover completion message) (P35). Thereafter, communication between the OLT 10 and the ONU 20 is carried out using the reallocated wavelengths (P1-2).

The communication system according to Embodiment 2 is configured as described above, and thus, similar to Embodiment 2, slave station devices can carry out communication with a master station device by switching wavelengths depending on the situation. Furthermore, the wavelength switching depending on the situation in slave stations can be performed by enabling the request of wavelength changes from slave stations.

Embodiment 3

In the embodiments described above, the configuration is described in which a master station device estimates whether or not operation of wavelength switching in slave station devices is completed, and notifies the completion of the switching. In a communication system according to Embodiment 3, however, a case will be described in which slave station devices transmit holdover-state completion notification to a master station device. The communication system according to Embodiment 3 will be described taking a PON system as an example, similar to Embodiments 1 and 2. The configuration is the same as that of Embodiment 1 and is shown in FIG. 1.

Next, operation will be described. Overall operation of the communication system according to Embodiment 3 is the same as that shown in FIG. 2. Here, descriptions of operation similar to Embodiment 1 will be omitted and switching operation of a wavelength in use (Step S109), which is different from that in Embodiment 1, will only be described.

An ONU 20 that receives wavelength-change notification from an OLT 10 switches at least one of the transmission wavelength and the reception wavelength of its own device to a notified wavelength. When the switching operation is completed, the ONU 20 transmits holdover-state completion notification to the OLT 10 using the post-switched wavelength. In this occasion, the OLT 10 regularly allocates a bandwidth to the ONU 20 so as for the ONU 20 to be able to transmit completion notification after the switching operation is completed. The OLT 10 that receives the holdover-state completion notification transmits the switching completion notification to the ONU 20 and completes switching completion operation.

Figure 8:
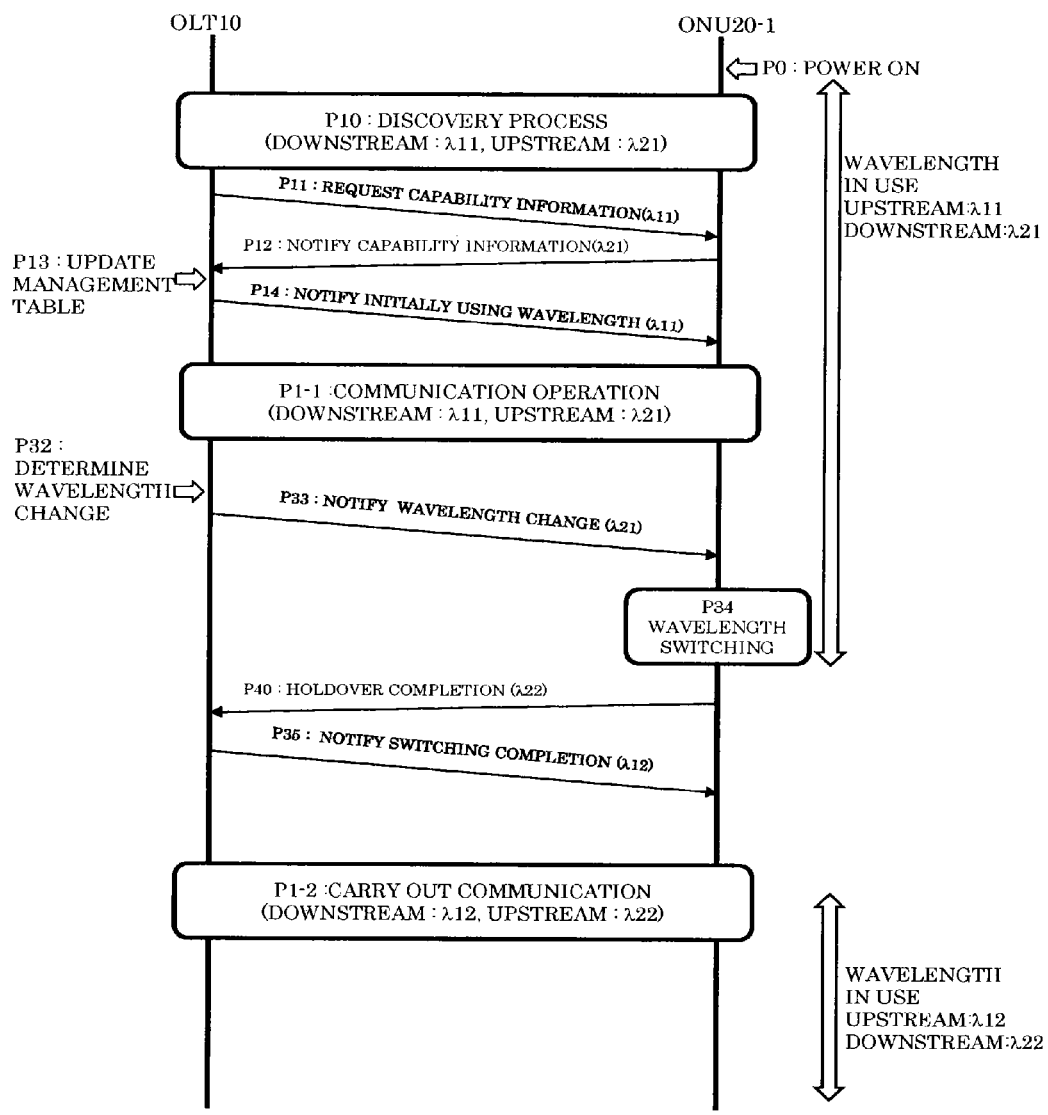
FIG. 8 is a sequence diagram showing operation of a communication system according to Embodiment 3 of the invention.

The operation described above will be explained using a sequence diagram. A sequence diagram according to the operation of Embodiment 3 is shown in FIG. 8. Similar to the case in Embodiment 1, the ONU 20 that is powered on performs the discovery process and notifies the OLT 10 of the capability information on the wavelength switching. The ONU 20 being assigned a wavelength to be used from the OLT 10 carries out communication with the OLT 10 using the wavelength.

The OLT 10 carries out communication using the downstream wavelength λ12 and the upstream wavelength λ22 for a while (P1-1) and communication using these wavelengths gradually becomes congested, and then the OLT 10 determines to switch the wavelengths of the ONU20-1 (P32). In this case, the OLT 10 determines, on the basis of the ONU management table held by its own device and the usage rate of each wavelength, etc., whether or not to change the wavelengths of the ONU 20-1, and then determines, on the basis of the same, wavelengths to be used if the wavelengths are determined to be changed (P32). When the wavelengths to be used by the ONU 20-1 are determined, the wavelength-change notification including notice for the wavelength change and information about the changed wavelengths is transmitted to the ONU 20-1 (P33).

The ONU 20 that receives notification of wavelength-change permission (or instruction) from the OLT 10 switches the wavelength that has been used so far to one of the other wavelengths in one of or both of the optical transmitter and receiver of its own device (P34). When the switching is completed, the ONU 20-1 transmits holdover completion notification that notifies the completion of the switching operation and the completion of the holdover state, to the OLT 10 (P40). The OLT 10 that receives the holdover completion notification detects the completion of the switching operation of the ONU 20-1 and transfers the switching completion notification (holdover completion message) (P35). Thereafter, communication between the OLT 10 and the ONU 20 is carried out using the reallocated wavelengths (P1-2).

Similar to the other embodiments, such a configuration in the communication system according to Embodiment 3 enables slave station devices to carry out communication with a master station device by switching the wavelength depending on the situation. Furthermore, an effect can be obtained in that the holdover completion notification transmitted by an ONU 20 makes it unnecessary for a master station device itself to check the holdover completion of slave station devices.

In the embodiments described above, it is natural that combinations of each embodiment may be possible without deviating from the essence of the invention.

INDUSTRIAL APPLICABILITY

As described above, a communication system, a master station device, a slave station device, a control unit, and a communication control method according to the present invention are useful for a communication system in which a master station device and a plurality of slave station devices are connected by a common line, and in particular, well suited to a communication system in which at least one of downstream communication and upstream communication is carried out using a plurality of wavelengths.

EXPLANATION OF REFERENCE CHARACTERS 10 station-side terminal device (OLT)
11 PON control unit
12 WDM coupler (WDM)
13 WDM coupler (WDM)
14 optical transmitter (Tx)
15 optical receiver (Rx)
20 user-side terminal device (ONU)
21 PON control unit
22 WDM coupler (WDM)
23 optical receiver (Rx)
24 optical transmitter (Tx)

The invention claimed is:

1. A communication system in which a master station device and a plurality of slave station devices are connected by an optical transmission line, and at least one of upstream communication and downstream communication is carried out using a plurality of wavelengths,
wherein the master station device comprises:
a controller that
receives, from the slave station device, first information on a switching time needed to switch a wavelength used by the slave station device,
assigns the slave station device the wavelength to be used in the communication, and
generates a first control signal for notifying the slave station device of the assigned wavelength; and
an optical transmitter that transmits the first control signal generated by the controller to the slave station device, and
wherein the slave station device comprises:
an optical transceiver that carries out communication with the master station device using the wavelength based on the first control signal received from the master station device,
wherein
when the wavelength used by the slave station device is switched, the controller of the master station device estimates, based on the first information, a switching completion time of the slave station device, and the optical transmitter transmits, based on the estimated switching completion time, switching completion notification to the slave station device.

2. The communication system according to claim 1,
wherein when a predetermined condition is satisfied, the controller determines to switch the wavelength used by a specific slave station device and generates a second control signal for notifying the specific slave station device of the switching of the wavelength; and
the optical transmitter transmits the second control signal to the specific slave station device.

3. The communication system according to claim 1,
wherein the slave station device transmits to the master station device second information on a wavelength usable by the slave station device; and
the controller of the master station device assigns, based on the second information, the wavelength to be used by the slave station device.

4. A master station device in a communication system in which a master station device and a plurality of slave station devices are connected by an optical transmission line, and at least one of upstream communication and downstream communication is carried out using a plurality of wavelengths, the master station device comprising:
a controller that
receives, from the slave station device, first information on a switching time needed to switch a wavelength used by the slave station device,
assigns the slave station device the wavelength to be used in the communication, and
generates a first control signal for notifying the slave station device of the assigned wavelength; and
an optical transmitter that transmits the first control signal generated by the controller to the slave station device,
wherein
when the wavelength used by the slave station device is switched, the controller estimates, based on the first information, a switching completion time of the slave station device, and the optical transmitter transmits, based on the estimated switching completion time, switching completion notification to the slave station device.

5. The master station device according to claim 4,
wherein when a predetermined condition is satisfied, the controller determines to switch the wavelength used by a specific slave station device and generates a second control signal for notifying the specific slave station device of the switching of the wavelength; and
the optical transmitter transmits the second control signal to the slave station device.

6. The master station device according to claim 5,
wherein the controller monitors an amount of traffic for each wavelength in the communication, and determines, based on the monitored traffic, the switching of the wavelength used by the specific slave station device.

7. The master station device according to claim 5,
wherein the controller monitors a number of the slave station devices, for each wavelength in the communication, and determines, based on the monitored number, the switching of the wavelength used by the specific slave station device.

8. The master station device according to claim 5,
wherein the controller determines, based on a wavelength-change request signal transmitted from the slave station device, the switching of the wavelength used by the slave station device.

9. The master station device according to claim 4,
wherein the controller sets an order of priority to the plurality of wavelengths, and determines, based on the order of priority, the wavelength to be used by the slave station device.

10. The master station device according to claim 4,
wherein the controller monitors a bandwidth usage rate for each wavelength in the plurality of wavelengths, and determines, based on the monitored bandwidth usage rate, the wavelength to be used by the slave station device.

11. The master station device according to claim 4, wherein the controller generates a request signal that requires the slave station device to notify information on the wavelength usable by the slave station device and determines, based on the notification received from the slave station device, a wavelength to be assigned to the slave station device; and the optical transmitter transmits the request signal generated by the controller to the slave station device.

12. The master station device according to claim 4, wherein, using a predetermined first wavelength, the controller performs a discovery process for registering the slave station device.

13. A slave station device that in a communication system in which a master station device and a plurality of slave station devices are connected by an optical transmission line, and at least one of upstream communication and downstream communication is carried out using a plurality of wavelengths, the slave station device comprising:

an optical transceiver that receives, from the master station device, a first control signal including information on a wavelength assigned to the slave station device by the master station device, and carries out communication with the master station device using the assigned wavelength based on the received first control signal; and a slave station-side controller that generates a wavelength-change request signal for requesting a change in wavelength used by the slave station device, wherein the optical transceiver transmits the wavelength-change request signal to the master station device, and the slave station-side controller completes a wavelength switching operation in response to reception of a switching completion notification that is transmitted from the master station device based on a switching completion time estimated by the master station device.

14. The slave station device according to claim 13, wherein the optical transceiver transmits to the master station device a control signal including information on a wavelength usable by the slave station device.

15. A controller of a master station device in a communication system in which a master station device and a plurality of slave station devices are connected by an optical transmission line, and at least one of upstream communication and downstream communication is carried out using a plurality of wavelengths, wherein the controller is configured to:

receive, from the slave station device, first information on a switching time needed to switch a wavelength used by the slave station device, assign the slave station device the wavelength to be used in the communication;

generate a first control signal for notifying the slave station device of the assigned wavelength and transmit the generated first control signal from an optical transmitter;

estimate, based on the first information, a switching completion time of the slave station device, when the wavelength used by the slave station device is switched, and transmit, based on the estimated switching completion time, switching completion notification from the optical transmitter to the slave station device.

16. A controller of a slave station device in a communication system in which a master station device and a plurality of slave station devices are connected by an optical transmission line, and at least one of upstream communication and downstream communication is carried out using a plurality of wavelengths, wherein the controller is configured to:

control an optical transceiver of the slave station device to receive, from the master station device, a first control signal including information on a wavelength assigned to the slave station device by the master station device, and carry out communication with the master station device using the assigned wavelength based on the received first control signal;

generate a wavelength-change request signal for requesting a change in wavelength used by the slave station device;

control the optical transceiver to transmit the wavelength-change request signal to the master station device; and complete a wavelength switching operation in response to reception of a switching completion notification that is transmitted from the master station device based on a switching completion time estimated by the master station device.

17. A communication control method in a communication system in which a master station device and a plurality of slave station devices are connected by an optical transmission line, and at least one of upstream communication and downstream communication is carried out using a plurality of wavelengths, the communication control method comprising:

a step wherein the master station device receives, from the slave station device, first information on a switching time needed to switch a wavelength used by the slave station device:

a notification step wherein the master station device, assigns the slave station device the wavelength to be used in the communication and notifies the slave station device of the assigned wavelength;

a data transmission and reception step wherein the slave station device performs, based on the notified wavelength from the master station device in the notification step, data transmission or data reception with the master station device; and an estimation step wherein when the wavelength used by the slave station device is switched, the master station device estimates, based on the first information, a switching completion of the slave station device, and transmits, based on the estimated switching completion time, switching completion notification to the slave station device.

* * * * *